Oct. 13, 1931.    K. H. KOOYOOMJIAN    1,827,702
COMBINED FINGER AND RING GAUGE
Filed Aug. 10, 1928
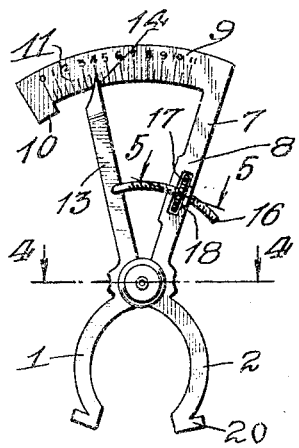
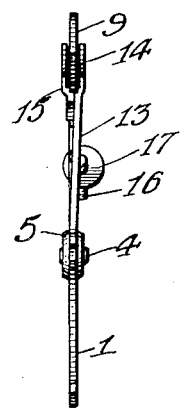
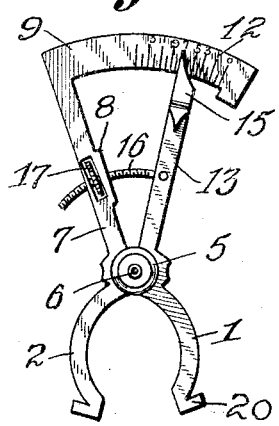
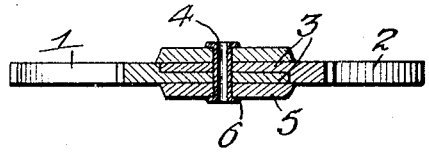
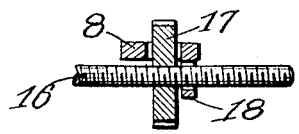
Karekin Kooyoomjian  Inventor
By Linton, Kellogg & Smith,
Attorneys Patented Oct. 13, 1931

1,827,702

UNITED STATES PATENT OFFICE

KAREKIN H. KOOYOOMJIAN, OF PROVIDENCE, RHODE ISLAND

COMBINED FINGER AND RING GAUGE

Application filed August 10, 1928. Serial No. 298,653.

This invention relates to improvements in measuring instruments, having for an object to provide a device capable of being used in the measuring and determining of the standardized size of a person's fingers and finger rings, dispensing with the necessity of the now prevalent and somewhat intricate types of devices comprehending a comparatively great number of measuring rings and the so-called ring stock graduated to thirteen or more sizes and by consequence, materially simplifying the procedure associate with such size finding.

It is also an equally important object of the invention to provide a device of the character mentioned so constructed that the same may be adjusted as to accurately measure the size of a person's finger or of a finger ring, and to indicate the particular size of such measurement upon a scale carried by the device.

Other objects of the invention will be in part obvious and in part pointed out hereinafter.

In order that the invention and its mode of operation may be readily understood by those skilled in the art to which it appertains, I have in the accompanying illustrative drawings and in the detailed following description based thereupon, set out one possible embodiment of the invention.

In these drawings:

Figure 1 is an elevation of one side of the improved measuring device.

Figure 2 is an end elevation or edge elevation of the same.

Figure 3 is an elevation of the opposite side of the measuring device.

Figure 4 is an enlarged transverse section taken on the line 4—4 of Figure 1, looking in the direction in which the arrows point, and Figure 5 is a similar view taken on the line 5—5 of Figure 1, looking in the direction in which the arrows point.

Having more particular reference to the drawings, in connection with which like characters of reference will designate corresponding parts throughout, the improved measuring device may be stated to comprise a pair of oppositely curved yet similarly shaped finger engaging arms, indicated by the numerals 1 and 2, said arms being provided with bearing portions 3 having openings formed therein and through which a securing rivet 4 is passed, the opposite ends of said rivet being engaged through locking caps 5 and then being upset or swaged, as indicated at 6. In this connection, it will be noted that the pivotally interconnected portions of the arms 1 and 2 are reduced and that these reduced portions are crossed and then pivotally interconnected through the medium of the rivet 4, aforesaid, thus, permitting the device to be manufactured in compact form and at the same time, to effect a durable pivotal connection between said arms.

The finger engaging arm 1 is formed with a substantially straight extension 7 having an enlarged and apertured intermediate portion 8, while a segmental graduation carrying finger 9 is fixedly arranged upon the free extremity of said extension and disposed laterally thereof, as is well shown in the Figures 1 and 3; the free end of this finger 9 being formed with a lip portion 10 adapted to serve as an effectual stop, the purpose of which will be subsequently described.

This graduation carrying finger 9, as will be noted upon reference to the Figures 1 and 2, has a series of standardized size indicating graduations generally indicated by the numerals 11 and 12 inscribed upon the opposite sides of the same, the graduations 11 serving as finger standardized measurements and the graduations 12 being adapted to serve as standardized finger ring measurements.

The finger engaging arm 2 is also formed with a substantially straight extension indicated by the numeral 13, the free end of which is reduced to provide a pointer-like device 14, while a right angularly shaped piece having a pointed free extremity and designated by the numeral 15, is secured to the opposite side of said pointer portion 14, this right angularly formed piece 15 having embracing engagement with the finger 9 and the pointed portion thereof being adapted to cooperate with the graduations 12, hereinbefore referred to.

That the finger engaging arms or portions 1 and 2 may be relatively adjusted, that is, moved with relation to each other, I provide an arcuate screw-threaded shank 16, bending one end of said shank into substantially right angular formation and loosely or pivotally engaging the same through an opening formed in the intermediate portion of the extension 13, as is well shown in the Figures 1 and 3. The free portion or extremity of this arcuate screw-threaded shank 16 is brought into engagement with and through a screw-threaded opening formed in an adjusting nut 17 arranged within the apertured intermediate portion 8 of the extension 7, while said free extremities of the shank 16 is also passed through an apertured ear 18 integral with a portion of said extension 7 and adjacent to the apertured intermediate portion 8 thereof.

Thus, it will be understood, that with turning of the adjusting nut 17, whose marginal portion is preferably serrated or knurled, relative pivotal movement will be imparted to the extensions 7 and 13, and simultaneously with this movement, corresponding relative movement will be imparted to the finger engaging portions or arms 1 and 2, hereinbefore referred to.

Movement of the pointer carrying portion of the extension 13 over the graduated finger portion 9 will be limited in one direction by reason of the ultimate engagement of the same with the lip portion 10, while movement of said extension in an opposite direction will, of course, be limited by engagement of said extension with an adjacent portion of the extension 7. Consequently upon this, it will be understood and appreciated that the adjustable movement of the arms 1 and 2 and their respective extensions 7 and 13 will be limited to the confines of that space occurring between said lip 10 and the extension 7.

In using my improved measuring device, when it is desired to measure and determine the size of a person's finger, the finger engaging portions or arms 1 and 2 are moved to such relative positions as to permit of the loose arranging or introduction of a person's finger therebetween. Following this, the adjusting nut 17 is rotated in a direction to cause movement of said arms 1 and 2 into contact with adjacent portions of said finger. When this contact has been effected, the person effecting the measuring refers to the graduations 11 upon one side of the piece 9, and that particular graduation adjacent the pointed portion 14 of the extension 13 will indicate the standardized size of the measurement.

When it is desired to measure and determine the standardized size of the finger ring, the same operation of the arms 1 and 2 is effected, that is, by rotating the adjusting nut 17 in a direction to bring the appurtenances 20 formed with the outer extremities of said arms into light contact with the inner periphery of the particular finger ring being measured. When the contact is effected, the person taking the measurement then refers to the graduations 12 upon the finger 9 and that particular graduation adjacent the pointer portion 15 of the extension 13 will indicate the particular standardized size.

Manifestly, the construction shown is capable of considerable modification and such modification as is within the scope of my claim, I consider within the spirit of my invention.

What I claim is:

A combined finger and ring gauge comprising, a pair of arms pivoted together at their intermediate portions, said arms having their opposing end portions on one side of their pivotal point, curved to converge towards each other for engaging a finger; means formed upon the extremities of said converging end portions of the arms for engaging the inner periphery of a ring; a measurement indicating member carried by one of said arms, on the other side of the pivot, said member having graduations on one face thereof to indicate the finger sizes and different graduations on its other face to indicate ring sizes; means carried by the remaining arm and cooperating with said measurement indicating member to determine the size of the finger or ring engaged at the engaging end of the arms; an arcuate shank screw threaded throughout its length, pivotally secured at one end to one of said arms and slidably connected at its free end to the other arm; and, an adjusting nut received on said shank and adapted to act upon the latter for imparting a relative movement to the arms and adjusting the same, said nut being in bearing engagement with the arm having slidable connection with said shank, for locking the arms in their adjusted positions and preventing their relative movement in any direction.

In testimony whereof I affix my signature.

KAREKIN H. KOOYOOMJIAN.